Oct. 11, 1938.   R. H. DRAEGER   2,132,405
FINE GRAIN TRANSLUCENT SCREEN
Filed Nov. 14, 1935   2 Sheets-Sheet 2
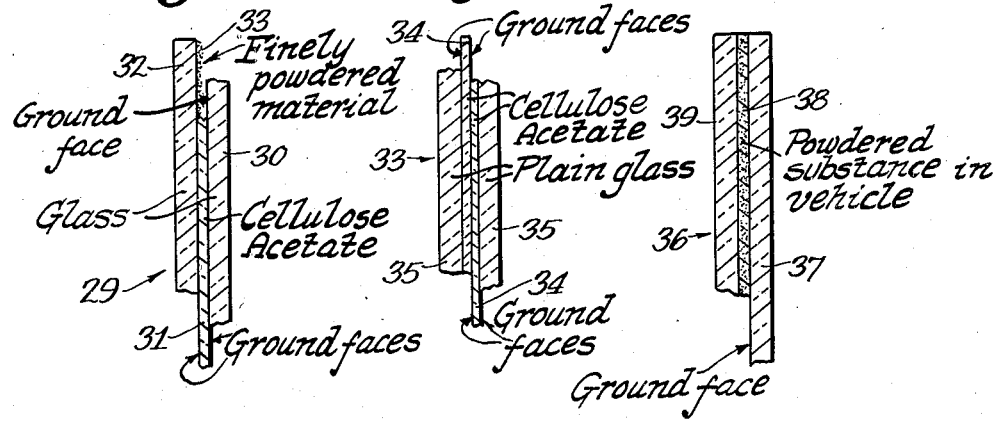
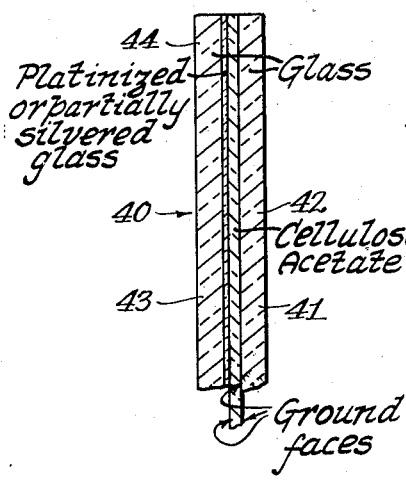 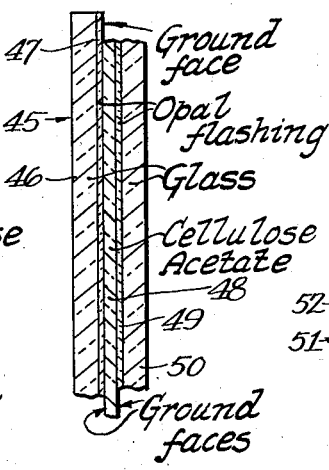 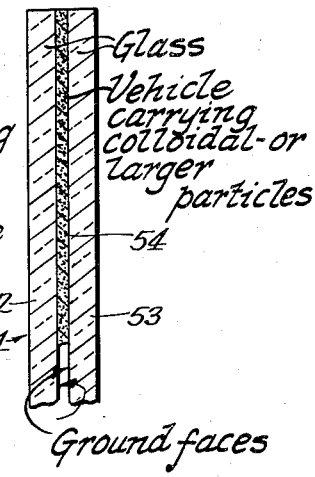
Inventor
RUPERT H. DRAEGER.
By Robert A. Lavender
Attorney Patented Oct. 11, 1938

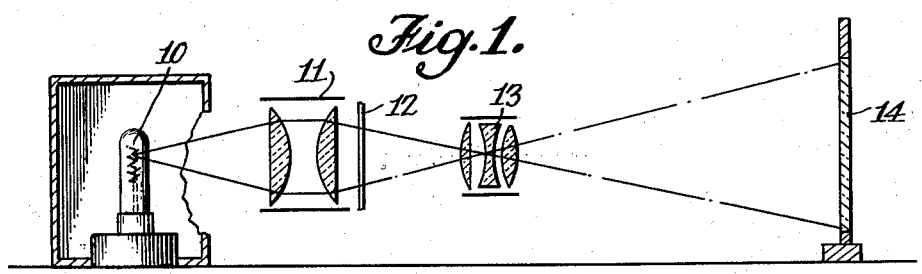
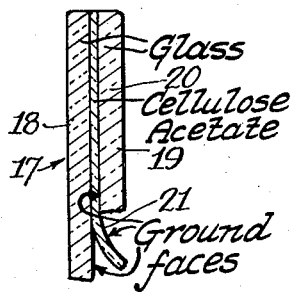
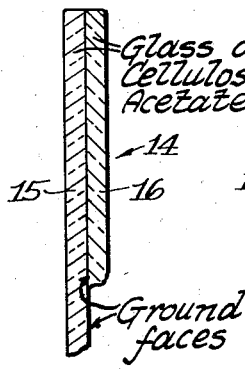
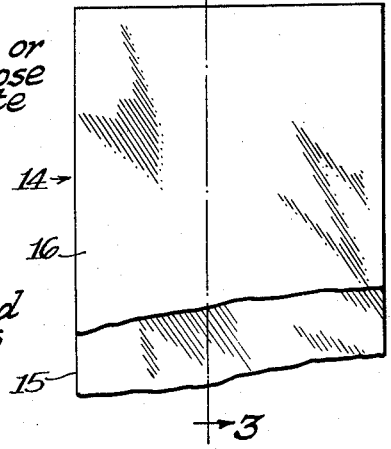
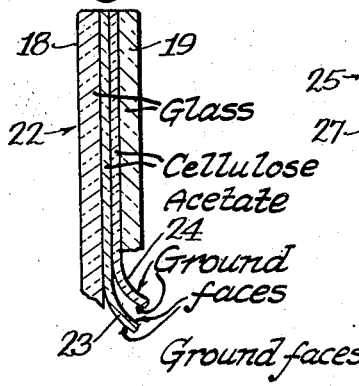
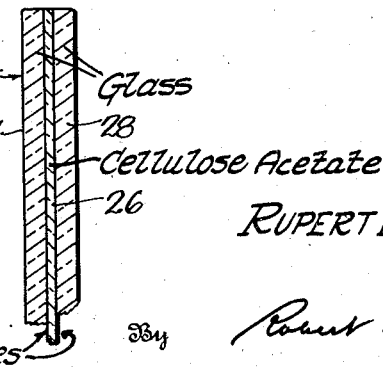

2,132,405

UNITED STATES PATENT OFFICE 2,132,405

FINE GRAIN TRANSLUCENT SCREEN

Rupert H. Draeger, United States Navy

Application November 14, 1935, Serial No. 49,754

6 Claims. (Cl. 88—24)

(Granted under the act of March 3, 1883, as amended April 30, 1928; 370 O. G. 757)

This invention relates to a projection screen and more particularly to a fine grained translucent projection screen especially intended for use with apparatus designed to project the image of a printed page or the like.

The translucent screen in the motion picture art has been highly developed in varied degrees but in the motion picture art there is not the necessity for the fineness of the screen that there is in what might be called "the book reading art", that is, where an image of a printed page is to be projected on a screen to a normal book-page size and be studied for an appreciable length of time at normal reading distance.

The use of a merely finely ground screen is not sufficient to solve the problems in this art because of the fact that the finer the grain of such screens, the less the dispersion with the consequent decrease in contrast of the image. Hence, it is obvious that fine texture alone on a single surface can never solve the problem, which is to produce a finer grained screen. Also, the production of a fine grain screen per se is not in itself a complete solution of the problem because of the fact that there still may be a "hot spot" present when the eyes are in a position in which the objective lens could be seen were there no intercepting screen. The "hot spot" is a too brilliantly illuminated area on the screen. This objectionable screen illumination is minimized by high dispersion screens which not only prevent one from seeing through the screen, but also increase the screen brilliance and hence image contrast in the less brilliant portions, that is, those around the area on the screen near the line from the objective lens to the eye. As is obvious, the finer the grain of the screen, the more detailed the image that can be produced thereon. However, as the fineness of the grain is increased, the dispersion necessary for rendering the image visible, is materially reduced by the finer grinding when using a single ground surface.

This invention overcomes the objections present by providing a plurality of fine grained surfaces in substantially a single plane, that is, in adjacent or minutely spaced planes. In its simplest form, two fine grained surfaces are placed face to face in substantially the same plane, but the invention also includes the provision of three or more fine grained surfaces, all placed within a small distance of one another by using one or more thin fine grained films held between transparent or translucent plates. By making use of such a plurality of fine grained surfaces, a screen is produced that materially improves the sharpness and detail of the image and at the same time completely eliminates the "hot spot", which combined advantages were not possible in any previously known type of screen.

Another embodiment of this invention which also solves the new needs of the image projection art, consists of a screen using a film containing finely ground or colloidal particles used as dispersers. One or more such films may be used between transparent supports, formed on the surface of a support, or combined with the previously described finely ground surfaces of the support or included film. The particles in such a film must be very finely ground and should at least approach colloidal fineness. Also, it is desirable to use a material of high index of refraction, such as titanium dioxide. Such a film may be made by mixing from 2 per cent to 10 per cent solid in a 5 per cent nitro-cellulose dispersion in ether alcohol, spreading on a glass plate, scraping off to a uniform thickness, permitting it to dry and peeling it off.

With the above and other objects in view, the invention consists in the construction, combination and arrangement of parts as will be hereinafter more fully described.

In the drawings:

Fig. 1 is a schematic view of the projection of an image on a screen;

Fig. 2 is a plane view, partially broken away, a simple form of this invention;

Fig. 3 is a sectional view of the screen taken on line 3—3 of Fig. 2; and

Figs. 4 to 12, inclusive, are sectional views, each a different modification of the screen, having a plurality of fine grained surfaces or thin layers of finely ground particles in substantially a single plane.

There is shown at 10 a projection lamp directing its rays to the condenser lens system 11 through the film 12 and to the objective lens system 13 and the translucent screen 14.

This is the conventional system used for projecting an image from any film, such as 12, to a screen for easily reading or observing the image projected thereon. This is especially intended for small-sized screens where the image projected from the film 12 will be the image of a printed page of a book or manuscript and will be projected on the screen 14 in substantially the same size as it originally appeared in the book or manuscript from which it was taken.

In the simplest form, when utilizing this invention, the screen 14 will be made of at least two plane materials, such as two sheets of glass 15 and 16. Instead of glass, however, a highly plasticized cellulose nitrate material, cellulosic compound or similar substance might be substituted. A fine grain is ground on one face of each glass 15 and 16 and these ground faces are then placed into contact with each other as shown in Figs. 2 and 3. The ground faces are thus brought into substantially the same plane and when screen 14 is composed of these two plane materials, with the ground faces in contact with each other, a translucent screen is produced having all the advantages of a fine grained screen in providing sharp detail of the image and omitting the loss of diffusion ever present in a fine grain screen having only a single ground surface.

As shown at 17 in Fig. 4 there is provided a form of the invention wherein there are more than two ground faces. In this form the image plane will preferably be between glass sheets 18 and 19, and formed on a plane sheet 20 of cellulose acetate, celluloid or the like, of extreme thinness such as .005 inch. One face 21 of the cellulose acetate sheet is finely ground and then screen 17 is assembled with the cellulose acetate sheet placed between the glass sheets 18 and 19, thus providing a fine grained screen having three finely ground faces in substantially the same plane.

There is shown at 22 in Fig. 5 a screen provided with two sheets 23 and 24 of extremely thin cellulose acetate placed between the two plane glasses 18 and 19. The cellulose acetate sheets 23 and 24 are provided with a fine graining on both faces thereof so that the screen 22 has six fine grained reflecting surfaces all in substantially the same plane.

At 25, Fig. 6, there is shown a screen having a single sheet of cellulose acetate 26 between the two sheets of clear glass 27 and 28. In this case the ground faces are placed only on opposite sides of the cellulose acetate sheets 26, thus providing a screen with two finely ground faces in substantially the same plane, the glasses 27 and 28 serving merely to keep the cellulose acetate sheets in a plane.

At 29 in Fig. 7 there is shown another form of screen having four reflecting faces. In this case the glass sheet 30 has one finely ground face. The cellulose acetate sheet 31 has ground faces on each side thereof and the glass sheet 32 has finely powdered material 33 secured to one face thereof, this finely powdered material forming, in effect, a ground face on this glass sheet 32.

In Fig. 8 the screen 33 includes two sheets of cellulose acetate 34, each finely ground on its opposite sides and placed between two unground glass sheets 35 to thus provide four ground faces.

At 36 in Fig. 9 there is shown a screen consisting of a plane glass sheet 37 having one ground face and a powdered substance placed in the vehicle 38 between the ground face of the sheet 37 and another glass sheet 39. This powdered substance will preferably be a colloidal material or possibly something coarser than a colloidal material.

The screen shown at 40 in Fig. 10 includes a glass sheet 41 having one ground face, a cellulose acetate sheet 42 having ground faces on its opposite sides and a sheet of glass 43 platinized or partially silvered as at 44.

At 45 in Fig. 11 there is shown a screen consisting of a plane glass 46, having an opal flashing 47 which is also finely ground, a cellulose acetate sheet 48 having its opposite faces ground, another but unground opal flashing 49 on a plane glass sheet 50.

At 51 in Fig. 12 there is shown a screen similar to the screen 36 in Fig. 9, except that the glass sheet 52 likewise has a ground face as well as the glass sheet 53 with the colloidal or larger particles 54 in a carrying vehicle placed between the sheets 52 and 53.

Obviously, in addition to the advantages pointed out above, this invention contemplates the use of all the existing features of the present art, which may likewise be incorporated with the improved scheme of this invention. Thus, colored glass, colored vehicles or colored particles may likewise be included with any of the forms just described.

By placing the diffusing or dispersing surfaces between glass sheets, or other similar carriers, there is the advantage of protecting against moisture, dust or finger prints at the plane of dispersion. Furthermore, especially when the carrier is of glass the plane remains at a fixed position which aids in maintaining the screen in focus over the entire area. Due to the high dispersion effect, the screen may be used for viewing from either side. As a further feature, the fineness of the grain may be graded from the extremely fine at the center of the screen to moderately fine at the edges of the screen in order to produce evenness of brilliance of the image, especially in cases where a short focus projection lens is used and the edge rays have a relatively high angle.

It will be particularly noted that the glass sheets which act as carriers for the dispersion surfaces are not to be cemented together but are merely held in mechanical contact by any suitable mechanical frame about its edges for the presence of a cement material would, in effect, negative the effect of the fine grinding and substantially eliminate the effectiveness of the invention if its index of refraction is near that of the materials cemented.

The invention described herein may be manufactured and used by or for the Government of the United States of America, for governmental purposes, without the payment of any royalties thereon or therefor.

I claim:

1. A fine grained translucent projection screen comprising a pair of sheets of transparent material placed in face to face contact with each other, the contact faces being finely ground to non-directional diffusing surfaces whereby the light transmitted through the screen is highly and substantially uniformly dispersed over the area of the screen.

2. A fine grained translucent projection screen having a plurality of dispersion surfaces, said screen including at least a pair of transparent sheets with at least one face of each sheet held in direct mechanical contact with a face of another sheet, said contacting faces forming at least a pair of finely non-directionally ground faces along the surface of contact between two sheets, whereby the light transmitted through the screen is highly and substantially uniformly dispersed over the area of the screen.

3. A projection screen formed of a plurality of sheets of transparent material each sheet comprising a thin sheet of light-permeable isotropic material and placed in mechanical contact with one of the other sheets, at least one of the contacting faces of said adjacent sheets and at least one of the contacting faces of one of the other sheets of transparent material being finely ground and forming a pair of finely ground surfaces whereby the light transmitted through the screen is highly and substantially uniformly dispersed over the area of the screen.

4. A translucent projection screen having a plurality of similarly ground dispersion surfaces, said dispersion surfaces being enclosed within a pair of carrying members of transparent material and dispersion material held between said carrying members, said dispersion material comprising a thin sheet of light permeable material ground to a fine non-directional dispersion surface on each side thereof said thin sheet forming a pair of closely spaced diffusion surfaces whereby the light transmitted through the screen is high and substantially uniformly dispersed over the area of the screen.

5. A translucent projection screen comprising two sheets of glass and a sheet of cellulose acetate held between the two said glass sheets said acetate sheet having both faces finely ground and forming a pair of diffusion surfaces closely spaced apart and contacting with the adjacent faces of the glass sheets, whereby light transmitted through the screen is highly and substantially uniformly dispersed over the area of the screen.

6. A translucent projection screen comprising two thin sheets of glass and two sheets of cellulose acetate firmly held in abutting contact between the two sheets of glass, both faces of each sheet of cellulose acetate being finely ground and forming a plurality of pairs of closely spaced diffusion surfaces whereby light transmitted through the screen is highly dispersed over the area of the screen.

RUPERT H. DRAEGER.